(12) United States Patent
Acharya et al.

(10) Patent No.: US 6,681,060 B2
(45) Date of Patent: Jan. 20, 2004

(54) IMAGE RETRIEVAL USING DISTANCE MEASURE

(75) Inventors: Tinku Acharya, Chandler, AZ (US); Bhargab B. Bhattacharya, Calcutta (IN); Arijit Bishnu, Calcutta (IN); Malay K. Kundu, Calcutta (IN); Chivukula A. Murthy, Calcutta (IN)

(73) Assignees: Intel Corporation, Santa Clara, CA (US); Indian Statistical Institute, Calcutta (IN)

( * ) Notice: Subject to any disclaimer, the term of this patent is extended or adjusted under 35 U.S.C. 154(b) by 340 days.

(21) Appl. No.: 09/817,000

(22) Filed: Mar. 23, 2001

(65) Prior Publication Data

US 2002/0164075 A1 Nov. 7, 2002

(51) Int. Cl.[7] .................................. G06K 9/54
(52) U.S. Cl. ................... 382/305; 382/190; 382/218; 358/403; 707/6
(58) Field of Search .................. 382/115, 118–119, 382/181, 190, 197, 204, 206, 209, 217–218, 219, 226, 305, 224; 358/403; 707/1–10

(56) References Cited

U.S. PATENT DOCUMENTS 5,642,431 A * 6/1997 Poggio et al. .............. 382/118
5,933,823 A * 8/1999 Cullen et al. ................... 707/6
6,104,833 A    8/2000 Naoi et al. .................. 382/190
6,480,840 B2 * 11/2002 Zhu et al. ....................... 707/3

OTHER PUBLICATIONS

Hengyong, et al "Face detection model based on distance measure of regional feature", IEEE, Jul. 2000, pp. 1479–1482.*

Sridhar, et al. "Range search in parallel using distributed data structures", IEEE, 1990, pp. 14–19.*

Wren, et al. "Pfinder: Real–time tracking of the human body", IEEE, 1997, pp. 780–785.*

N. Kato et al: *A Handwritten Character Recognition System Using Directional Element Feature & Asymmetric Mahalanobis Distance*, IEEE Transactions On Pattern Analysis & Machine Intelligence, IEEE Inc., New York, Us, vol. 21, No. 3, Mar. 1999, pp. 258–262.

N. Kato et al: *A Handwritten Character Recognition System Using Modified Mahalanobis Distance*, Systems & Computers in Japan, Scripta Technical Journals, New York, USA, vol. 28, No. 1, 1997, pp. 46–54.

S. Kapoor et al: *New Techniques For Exact & Approximate Dynamic Closest–Point Problems*, Proceedings Of The Tenth Annual Symposium On Computational Geometry, Stony Brook, New York, USA, Jun. 1994, pp. 165–174.

M. Flicker et al.: *Query By Image And Video Content*: The QBIC System Computer, III Computer Society, Long Beach, CA, vol. 28, No. 9, Sep. 1995, pp. 23–32.

W. Niblack et al.: *The QBIC Project: Querying Images By Content Using Color, Texture, And Shape*, Proceedings Of The SPIE, SPIE, Bellingham, VA, USA, vol. 1908, 1993, pp. 173–187.

R. De Maesschalck et al., *The Mahalanobis Distance*, Chemometrics & Intelligent Laboratory Systems, Elsevier Science Publishers, Amsterdam, NL, vol. 50, No. 1, Jan. 2000, pp. 1–18.

(List continued on next page.)

Primary Examiner—Daniel Mariam
(74) Attorney, Agent, or Firm—Trop, Pruner & Hu, P.C.

(57) ABSTRACT

A Mahalanobis distance measure is used to identify a query image among plural images in a database. The measure may be used to rank the similarity of one or more images to the query image. A variance-covariance matrix is calculated for all images in the database. The variance-covariance matrix is used to calculate the Mahalanobis distance between the query image and one or more images in the database. A range tree may be used to identify likely image candidates for performing the Mahalanobis distance measurement.

20 Claims, 7 Drawing Sheets

OTHER PUBLICATIONS

C.R. Wren et al., *Pfinder: Real–Time Tracking of the Human Body*, IEEE, vol. 19, No. 7, Jul. 1997, pp. 780–785.

R. Sridhar et al., *Range Search In Parallel Using Distributed Data Structure*, IEEE, Apr. 1990, pp. 14–19.

Y. Hengyong et al., *Face Detection Model Based on Distance Measure of Regional Feature*, IEEE, Jul. 2000, pp. 1479–1482.

C.R. Dyer, "Computing the Euler Number of an Image from its Quadtree", Computer Graphics Image Processing, vol. 13, No. 3, pp. 270–276, Jul. 1980.

R.E. Gonzalez et al., "Digital Image Processing", Addison–Wesley, Reading, Massachusetts, pp. 504–506, 1993.

S.B. Gray, "Local Properties of Binary Images in Two Dimensions", IEEE Trans. Computers, No. 5, pp. 551–561, May 1971.

W.K. Pratt, "Digital Image Processing", John Wiley & Sons, 1978, pp. 526–531.

H. Samet et al., "Computing Geometric Properties of Images Represented by Linear Quadtrees", IEEE Trans. PAMI, vol. PAMI–7, No. 2, Mar. 1985, pp. 229–241.

Ø.D. Trier et al., "Feature Extraction Methods of Character Recognition—A Survey", appeared in *Pattern Recognition*, vol. 29, No. 4, pp. 641–662, 1996.

N. Katayama et al., "The SR–tree: An Index Structure for High–Dimensional Nearest Neighbor Queries", published in the Proceedings of the 1997 ACM SIGMOD International Conference on Management of Data, May 13–15, 1997, Tucson, Arizona.

"The SR–Tree (Sphere/Rectangle–Tree)", available at http://research.nii.ac.jp/~katayama/homepage/research/srtree/English.html, Dec. 15, 2000.

Archarya et al., U.S. patent application No. 09/722,979, filed Nov. 27, 2000, entitled "Developing an Euler Vector for Images".

Acharya et al., U.S. patent application No. 09/722,982, filed Nov. 27, 2000, entitled "Computing the Euler Number of a Binary Image".

* cited by examiner

Figure 1

N x M pixel matrix

Figure 2

N x M pixel matrix

Figure 3

N x M pixel matrix b7 b6 b5 b4 b3 b2 b1 b0

IMAGE RETRIEVAL USING DISTANCE MEASURE

BACKGROUND

This invention relates to image processing and, more particularly, to the characterization of images.

Image processing refers to the analysis and manipulation of images using a computer. The discipline encompasses a wide array of techniques, including pattern recognition and other image analysis, compression and encoding, such as image transmission, and image construction, to name but a few examples. Image processing is used in diverse fields such as astronomy, medicine, military operations, communications, geology, meteorology and so on.

Although visual in nature, images may be characterized so that a computer or other processor-based system may also "see" the image or, for example, distinguish the image from other images. Identifying the moment, entropy, center of mass, orientation, or other histogram-based features is one approach to image characterization. Structural and syntactic features of the image may serve as characteristic parameters. Geometric indicia, such as perimeter, area, eccentricity, or Euler number, may numerically identify the image.

Because images are often perturbed, such as during transmission, the characteristic parameters of the image are ideally invariant following transformations. Image transformations may include translation, rotation, scaling, shearing, compression, inclusion of noise, and so on.

Particularly in the emerging domain of Internet technology, image searching may be an important tool. Different characteristics of the images, used for image searching, may have widely varying results, however. This type of image searching is known as content-based image retrieval.

One technique for retrieving images from a database of images is to associate each image with a certain number of features. Using feature vectors, each image, represented by its feature values, is mapped to a point in an n-dimensional feature space, where there are n features identified. A similarity query is then used to retrieve the images lying in a neighborhood close to the query image.

In executing these similarity queries, the precision of obtaining the image may be offset by the size of the image database and the time to calculate the various features involved in the similarity query.

Thus, there is a continuing need for optimizing image retrieval methods.

DETAILED DESCRIPTION

Euler Number

To retrieve an image from a database of images, each image may be characterized to distinguish it from the other images. For example, the image may be characterized numerically.

For example, each binary image of a database of binary images may be assigned an Euler number. An Euler number of a binary image is the difference between the number of connected components (objects) in the image and the number of holes in the image.

The Euler number is a topological feature of the binary image. The Euler number remains invariant under translation, rotation, scaling and rubber-sheet transformation of the binary image.

Figure 1:
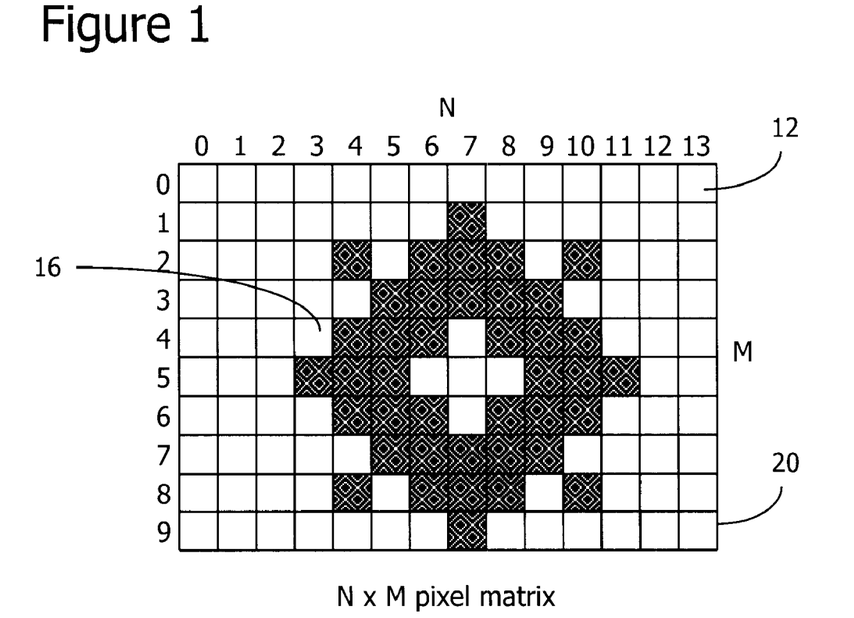
FIG. 1 is a block diagram of a binary image according to one embodiment of the invention.
Figure 2:
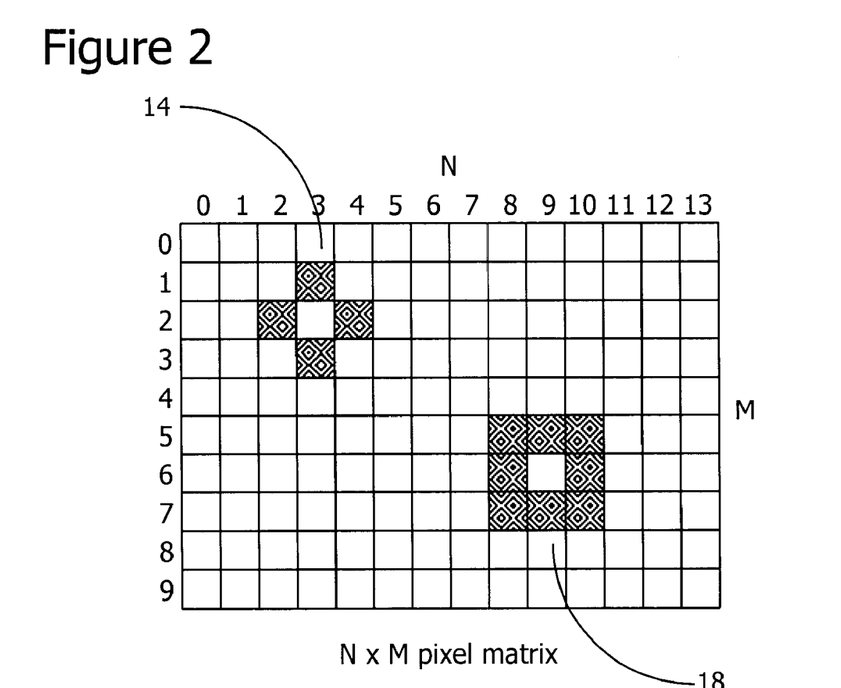
FIG. 2 is a block diagram of a 4- and 8-neighborhood according to one embodiment of the invention.

A binary image 16 may be represented in an N×M pixel matrix 20, in which an object pixel 12 is shaded, to indicate a binary value of 1, while a background pixel 12 is unshaded, to indicate a binary value of 0, as depicted in FIG. 1. Within the N×M pixel matrix 20, a connected component is a set of object pixels such that any object pixel 12 in the set is in the eight (or four) neighborhood of at least one object pixel 12 of the same set. Both a 4-neighborhood 14 and an 8-neighborhood 18 are depicted in FIG. 2.

In addition to connected components in the binary image, in one embodiment, a hole is defined as a set of background pixels, such that any background pixel in the set is in the 4 (or eight) neighborhood of at least one background pixel of the same set and this entire set of background pixels is enclosed by a connected component.

A run of the $i^{th}$ column (or row) of the pixel matrix 20 is defined to be a maximal sequence of consecutive ones in the $i^{th}$ column (or row). Two runs appearing in two adjacent columns (rows) each are said to be neighboring if at least one pixel of a run is in the eight (or four) neighborhood of a pixel of the other run.

If the binary image 16, known as I, consists of a single row (column) i, the Euler number E(I) of the image 16 is the same as the number of runs, denoted as R(i), of the image 16, as shown by the following formula:

$$E(I)=R(i)$$

However, where the binary image 16 consists of multiple rows (columns), the binary image, I, may be divided into partial images, $I_i$. Further, the Euler number of the entire image can be found using the following relations:

$$E(I)\cup E(I_1=I_2)=E(I_1)+E(I_2)-E(I_1\cap I_2), \text{ and}$$

$$E(I_{i-1}\cap I_i)=O_i$$

where $O_i$ equals the number of neighboring runs between two consecutive rows (columns), e.g., the $(i-1)^{th}$ and the $i^{th}$ rows (columns).

According to one embodiment, the Euler number of a binary image is defined as the difference between the sum of the number of runs for all rows (columns) and the sum of the neighboring runs between all consecutive pairs of rows (columns) of the N×M pixel matrix. Stated mathematically:

$$E(I_N) = \sum_{i=1}^{N} R(i) - \sum_{i=2}^{N} O_i$$

where $I_N=I$ denotes the entire image. Thus, by knowing the number of runs and the number of neighboring runs in the binary image, I, the Euler number, E(I) may be computed.

Euler Vector

Figure 3:
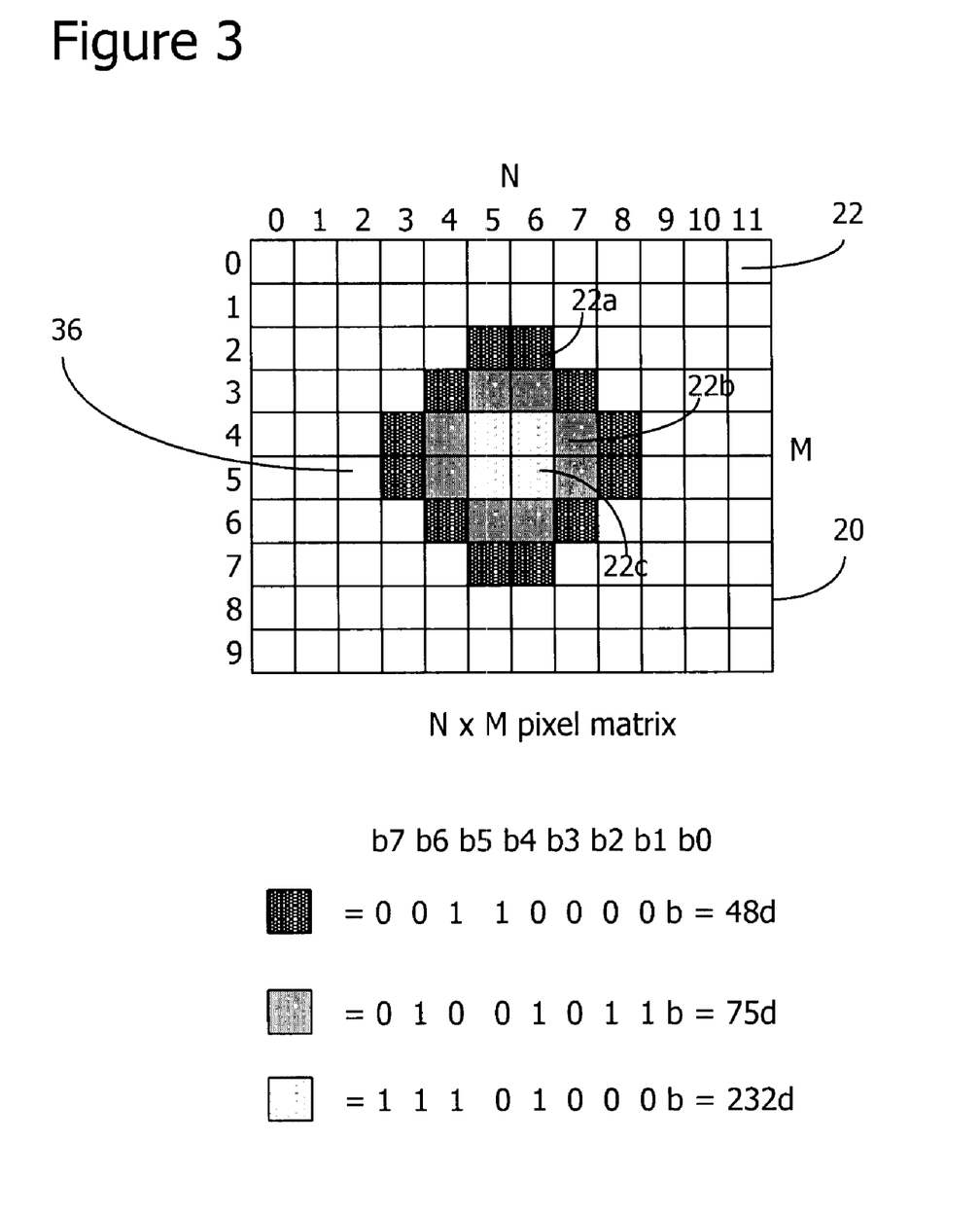
FIG. 3 is a block diagram of a gray-tone image according to one embodiment of the invention.
Figure 4A:
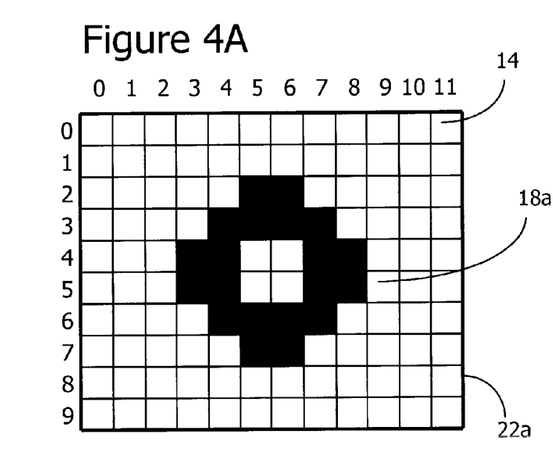
FIGS. 4A through 4D are binary images of the gray-tone image of FIG. 3 according to one embodiment of the invention.
Figure 4B:
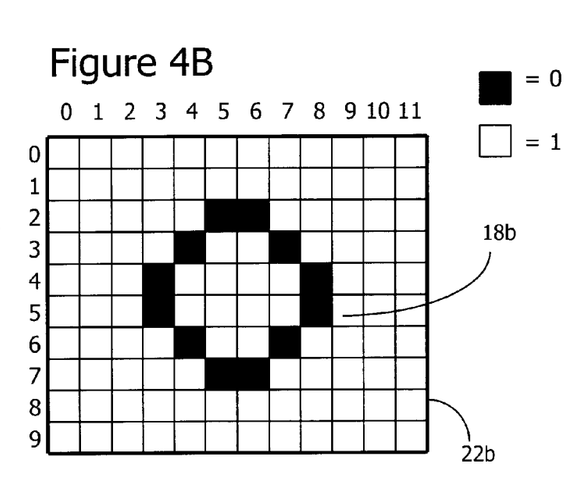
Figure 4C:
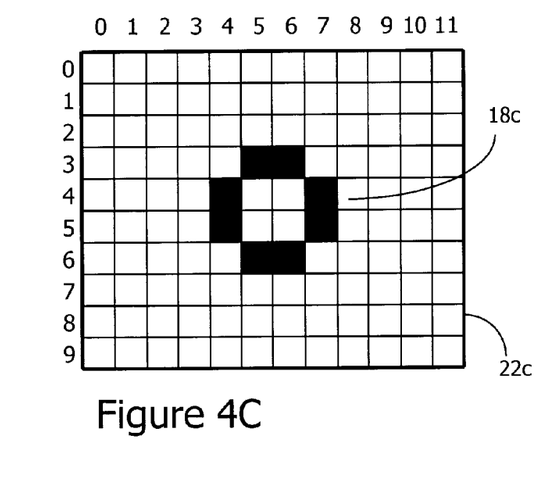
Figure 4D:
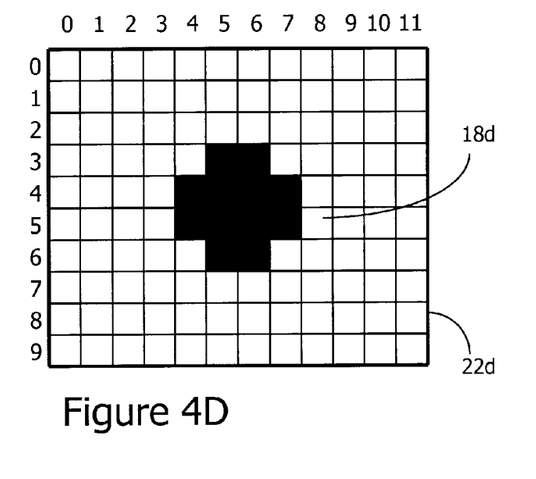
Figure 5A:
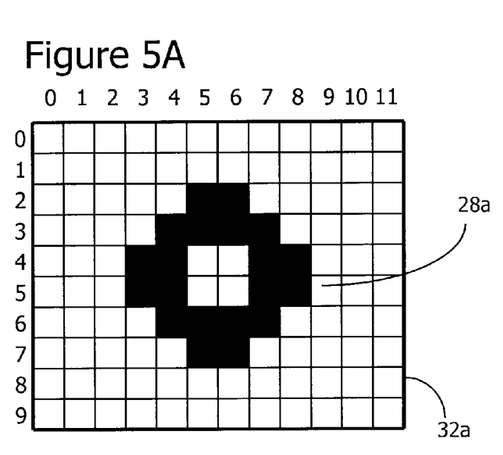
FIGS. 5A through 5D are reflected gray code representations of the gray-tone image of FIG. 3 according to one embodiment of the invention.
Figure 5B:
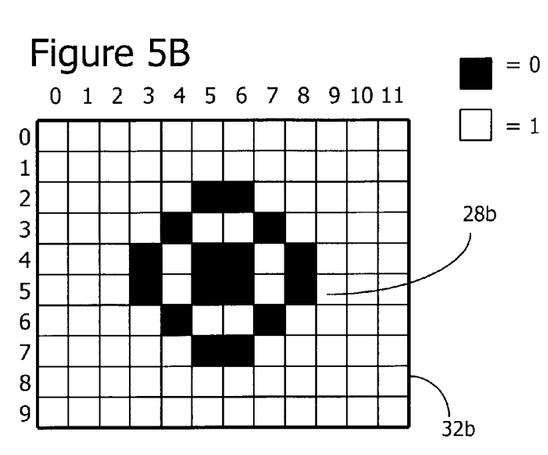
Figure 5C:
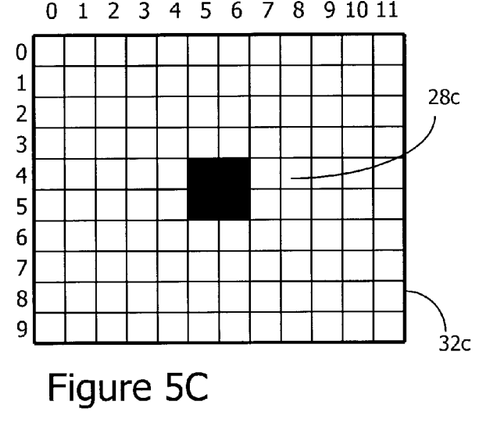
Figure 5D:
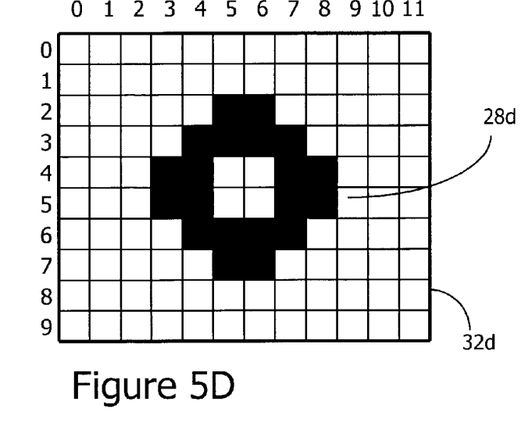

The Euler number for binary images may be extended to gray-tone images. For example, as depicted in FIG. 3, a gray-tone image 36 may be represented in an N×M matrix in which each element 22 is an integer between 0 and 255 decimal denoting the intensity of the corresponding pixel. The intensity value of each element may be represented by an 8-bit binary vector ($b_7$, $b_6$, $b_5$, $b_4$, $b_3$, $b_2$, $b_1$, $b_0$). The gray-tone image 36 thus comprises eight bit planes, or eight distinct binary images.

The hypothetical gray-tone image 36 includes three 8-bit pixels 22a, 22b, and 22c, each of which represents a distinct intensity value, as shown.

In one embodiment, the first four most significant bit planes ($b_7$, $b_6$, $b_5$, and $b_4$) of the 8-bit binary vector are retained. In essence, four binary images are retained. In FIGS. 4A–4D, the four binary images 18a–18d are depicted, representing the four most significant bit planes of the gray-tone image 36 of FIG. 3. An Euler number may be computed for each binary image 18a–18d.

In one embodiment, before computing the Euler number for each binary image 18, the four-bit binary vector ($b_7$, $b_6$, $b_5$, $b_4$), is converted to its corresponding reflected gray code vector ($g_7$, $g_6$, $g_5$, $g_4$), in which:

$g_7 = b_7$ $g_6 = b_7 \oplus b_6$ $g_5 = b_6 \oplus b_5$ $g_4 = b_5 \oplus b_4$ where $\oplus$ denotes XOR (modulo-2) operation. The result of the reflected gray code conversion is depicted in binary images 28a through 28d of FIGS. 5A–5D, respectively, according to one embodiment. It is well-known that for any binary vector, the corresponding reflected gray code is unique and vice-versa.

Accordingly, in one embodiment, the Euler vector, $\xi_K$ of the original gray-tone image, K, is a 4-tuple ($E_7$, $E_6$, $E_5$, $E_4$), where $E_i$ is the Euler number of the partial binary image, $g_i$, formed by the $i^{th}$ bit plane, $4 \leq i \leq 7$, corresponding to the reflected gray code representation of intensity values.

Thus, in addition to calculating an Euler number for a binary image, an Euler vector for a gray-tone image may be calculated by considering the four most significant binary bit planes of the image, converting the 4-bit binary vector to its corresponding reflected gray code, and computing the Euler number for each reflected gray code representation.

In characterizing gray-tone images using Euler vectors, the elements of the Euler vector have, in some cases, a decreasing order of importance. That is, element $E_7$ is most significant in characterizing the image, next is $E_6$, and so on. Further, the ranges and the variances of various elements of the Euler vector widely differ. In such an environment, the Mahalanobis distance may be adopted to provide a measure that captures the similarity and dissimilarity of properties for features of a set of images.

Mahalanobis Distance

The Euler number $E_i$, may thus characterize a binary image. By extension, an Euler vector $\xi_i$, including four Euler numbers, $E_7$, $E_6$, $E_5$, and $E_4$, may characterize a gray-tone image. Each Euler number $E_i$, may be described as a "feature" of the gray-tone image, according to one embodiment. In one embodiment, Euler vector characterization may form a basis for image retrieval.

Suppose an Euler vector, $\xi_K$, describes features for each gray-tone image, K, in an image database. A new image, q, having features defined by Euler vector $\xi_q$, is to be retrieved from the image database. The newly received image, q, may be compared to each of the images in the image database. Once a match is found, image retrieval is complete.

One way to compare two things is to measure a distance between them. Distance measurement may be performed between scalars, such as numbers, but also may be performed between vectors. Where an image is described using a vector, the distance between the vector and a second image having its own vector may be computed. Accordingly, the distance between the two images may be computed.

Figure 6:
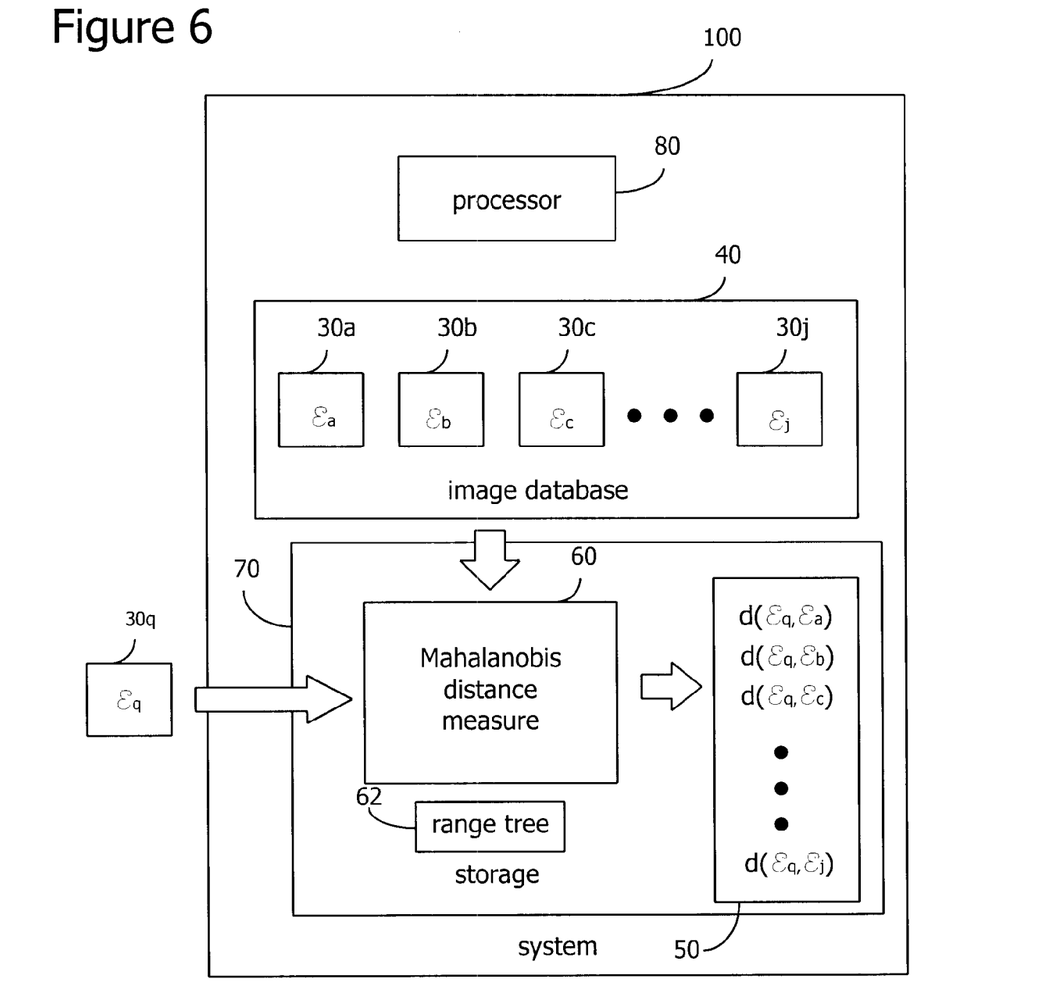
FIG. 6 is a block diagram of a system according to one embodiment of the invention.

Suppose the query image 30q is not found in the image database 40. Rather than comparing for an exact match, in one embodiment, a distance measure between the query image 30q and other images in the database may be taken. One distance measure is known as a Mahalanobis distance measure. The Mahalanobis distance measure calculates the "distance" between the query image 30q and the other images in the database, then ranks the distance results. The smallest distance result is the "match."

The Mahalanobis distance measure operation is depicted in FIG. 6, according to one embodiment. A system 100 includes a processor 80, an image database 40 and a Mahalanobis distance measure 60. The image database 40 includes multiple images 30, in which each has an associated Euler vector, $\xi_K$. The Mahalanobis distance measure 60 receives each of the images 30 from the image database 40, and compares them to a query image 30q, which includes its own Euler vector, $\xi_q$. In one embodiment, the Mahalanobis distance measure 60 is a software program, executable by the processor 80, for performing Mahalanobis distance measurements between the query image 30q and one or more images 30 from the image database 40.

A result table 50, according to one embodiment, includes distance calculations as between the query image 30q and one or more images 30 in the image database 40. In one embodiment, the distance results are ranked according to their size. Thus, the first (or last) entry in the result table 50 is the "match" of the distance calculation.

Each of the images 30 in the image database 40 may be classified or described according to the Euler vector, $\xi_K$. The elements of the Euler vector, or Euler numbers, $E_7$, $E_6$, $E_5$, and $E_4$, represent features of the gray-tone image 30 they classify. Conventionally, distance measures between two vectors may be used to capture the "closeness" of the two vectors. For example, the Euclidean distance between vectors x and y, where x has four elements, $x_1$, $x_2$, $x_3$, and $x_4$ and y likewise has four elements, $y_1$, $Y_2$, $y_3$, and $y_4$ is given by the following equation:

$$d(x, y) = \sqrt{[(x_1 - y_1)^2 + (x_2 - y_2)^2 + (x_3 - y_3)^2 + (x_4 - y_4)^2]}$$

For some phenomena, the Euclidean distance does not provide a very good distance measure. Recall that when characterizing gray-tone images by an Euler vector, the elements of the vector have a decreasing level of importance. That is, $E_7$ is more important in characterizing the gray-tone image 30 than $E_6$; $E_6$ is more important in characterizing the image 30 than $E_5$; and so on.

Further, the ranges and the variances of the elements ($E_7$, $E_6$, $E_5$, and $E_4$) of the vector widely differ in their magnitudes. In such an environment, the Mahalanobis distance may provide a better measure than the Euclidean distance for capturing the similarity/dissimilarity properties between the images 30 of the database 40.

The Mahalanobis distance between two vectors, x and y, may be derived from the following equation:

$$d(x,y)=\sqrt{[(x-y)'*M_{VC}^{-1}*(x-y)]}$$

where ' represents matrix transposition. $M_{VC}$ is the variance-covariance matrix formed by the image feature vectors: $x'=(x_1, x_2, \ldots, x_N)$ and $y'=(y_1, y_2, \ldots, y_N)$. Here, (x-y)' is a (1×n) matrix, $M_{VC}^{-1}$ is an (n×n) matrix, and (x-y) is an (n×1) matrix; hence their product is a scalar.

The variance-covariance matrix of x, denoted as $M_{VC}$, is an N×N matrix given by:

$M_{VC}(i,j)$=variance of the $i^{th}$ feature $x_i$, if i=j;

=covariance of the $i^{th}$ variable $x_i$ and jth variable $x_j$ if i≠j

Note that $M_{VC}(i, j)=M_{VC}(j, i)$. The variance-covariance matrix of x is also known as a dispersion matrix.

To compute the variance-covariance matrix of image feature vectors, both the variance and the covariance are computed. The variance of a feature, $x_i$, is defined as:

Variance $(x_i) = \delta_{xi}^2 = [\Sigma_{k=1}^{L}(x_{ik}-\text{mean}(x_i))^2]/L$ where L is the number of the observations of the variable (feature) $x_i$.

The features of a gray-tone image may also be correlated. The measure of the correlation between any two features is known as covariance. Covariance is defined as follows:

Covariance $(x_i,x_j)=\text{cov}(x_i,x_j)=[\Sigma_{k=1}^{L}(x_{ik}-\text{mean}(x_i))(x_{jk}-\text{mean}(x_j))]/L$ Once the variance and covariance values are determined, the variance-covariance matrix, $M_{VC}$, may be computed. The variance-covariance matrix, $M_{VC}$, looks like:

$$M_{VC} = \begin{vmatrix} \delta_{x1}^2 & \text{cov}(x_2, x_1) & \text{cov}(x_3, x_1) & \cdots & \text{cov}(x_n, x_1) \\ \text{cov}(x_1, x_2) & \delta_{x2}^2 & \text{cov}(x_3, x_2) & \cdots & \text{cov}(x_n, x_3) \\ \text{cov}(x_1, x_3) & \text{cov}(x_2, x_3) & \delta_{x3}^2 & \cdots & \text{cov}(x_n, x_3) \\ & & & \vdots & \\ \text{cov}(x_1, x_{(n-1)}) & \text{cov}(x_2, x_{(n-1)}) & \text{cov}(x_3, x_{(n-1)}) & \cdots & \text{cov}(x_n, x_{(n-1)}) \\ \text{cov}(x_1, x_n) & \text{cov}(x_2, x_n) & \text{cov}(x_3, x_n) & \cdots & \delta_{xn}^2 \end{vmatrix}$$

Figure 7:
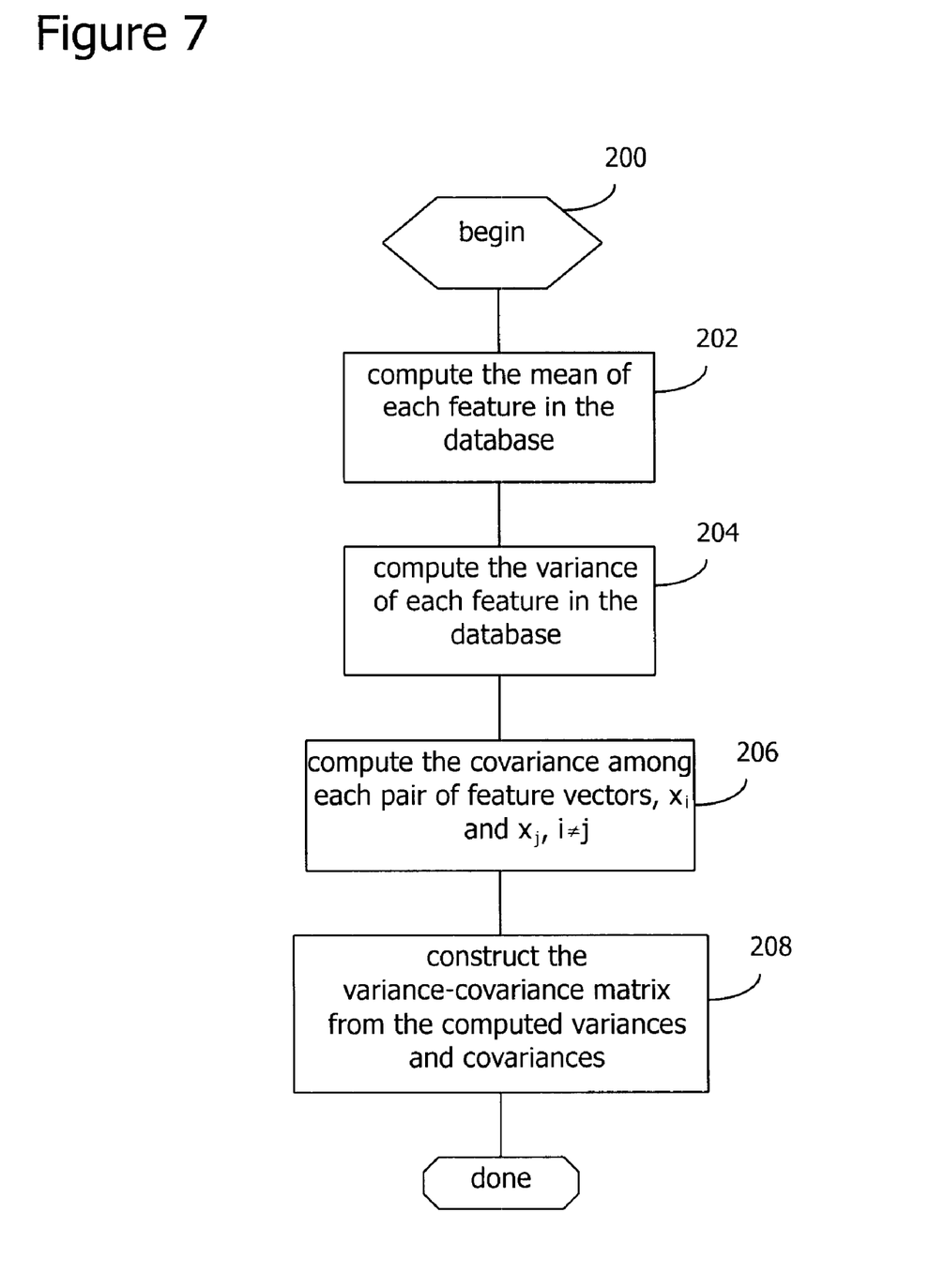
FIG. 7 is a flow diagram for calculating a variance-covariance matrix for plural images of the system of FIG. 6 according to one embodiment of the invention.

In FIG. 7, the variance-covariance matrix, $M_{VC}$, for a database of images 30, is computed according to one embodiment. To illustrate, assume the image database 40 includes images 30 in which each image $30_K$ has an associated Euler vector, $\xi_K$. Each Euler vector, $\xi_K$ includes Euler numbers $E_{K7}$, $E_{K6}$, $E_{K5}$, and $E_{K4}$, which constitute "features" of the image $30_K$.

The variance-covariance matrix may be computed for all the images 30 of the database 40. Subsequently, a query image $30q$ may be received by the system 100, as depicted in FIG. 6. Once the variance-covariance matrix, $M_{VC}$, is calculated, image queries may quickly retrieved desired images.

In one embodiment, the Mahalanobis distance measure 60 computes the mean (or average) of each feature of the image database 40 (block 202). Because the Euler vector, $\xi_K$, includes four features, Euler numbers $E_7-E_4$, four mean calculations are computed, as follows:

$$\mu_{E7} = (E_{a7} + E_{b7} + E_{c7} + \ldots + E_{j7})/j$$

$$\mu_{E6} = (E_{a6} + E_{b6} + E_{c6} + \ldots + E_{j6})/j$$

$$\mu_{E5} = (E_{a5} + E_{b5} + E_{c5} + \ldots + E_{j5})/j$$

$$\mu_{E4} = (E_{a4} + E_{b4} + E_{c4} + \ldots + E_{j4})/j$$

where j is the number of images in the image database 40.

The features of each image 30 in the database 40 may be correlated. The measure of the correlation between any two features is reflected in the covariance equation, defined above. Accordingly, in one embodiment, the covariance between features of the images 30 is calculated (block 206). For example, in the illustrated database 40, the following covariance equations may be computed:

$$\text{cov}(E_7,E_6)=\text{cov}(E_6,E_7)=[(E_{a7}-\mu_{E7})(E_{a6}-\mu_{E6})+(E_{b7}-\mu_{E7})(E_{b6}-\mu_{E6})+ (E_{c7}-\mu_{E7})(E_{c6}-\mu_{E6})+\ldots+(E_{j7}-\mu_{E7})(E_{j6}-\mu_{E6})]/j$$

$$\text{cov}(E_7,E_5)=\text{cov}(E_5,E_7)=[(E_{a7}-\mu_{E7})(E_{a5}-\mu_{E5})+(E_{b7}-\mu_{E7})(E_{b5}-\mu_{E5})+ (E_{c7}-\mu_{E7})(E_{c5}-\mu_{E5})+\ldots+(E_{j7}-\mu_{E7})(E_{j5}-\mu_{E5})]/j$$

$$\text{cov}(E_7,E_4)=\text{cov}(E_4,E_7)=[(E_{a7}-\mu_{E7})(E_{a4}-\mu_{E4})+(E_{b7}-\mu_{E7})(E_{b4}-\mu_{E4})+ (E_{c7}-\mu_{E7})(E_{c4}-\mu_{E4})+\ldots+(E_{j7}-\mu_{E7})(E_{j4}-\mu_{E4})]/j$$

$$\text{cov}(E_6,E_5)=\text{cov}(E_5,E_6)=[(E_{a6}-\mu_{E6})(E_{a5}-\mu_{E5})+(E_{b6}-\mu_{E6})(E_{b5}-\mu_{E5})+ (E_{c6}-\mu_{E6})(E_{c5}-\mu_{E5})+\ldots+(E_{j6}-\mu_{E6})(E_{j5}-\mu_{E5})]/j$$

$$\text{cov}(E_6,E_4)=\text{cov}(E_4,E_6)=[(E_{a6}-\mu_{E6})(E_{a4}-\mu_{E4})+(E_{b6}-\mu_{E6})(E_{b4}-\mu_{E4})+ (E_{c6}-\mu_{E6})(E_{c4}-\mu_{E4})+\ldots+(E_{j6}-\mu_{E6})(E_{j4}-\mu_{E4})]/j$$

$$\text{cov}(E_5,E_4)=\text{cov}(E_4,E_5)=[(E_{a5}-\mu_{E5})(E_{a4}-\mu_{E4})+(E_{b5}-\mu_{E5})(E_{b4}-\mu_{E4})+ (E_{c5}-\mu_{E5})(E_{c4}-\mu_{E4})+\ldots+(E_{j5}-\mu_{E5})(E_{j4}-\mu_{E4})]/j$$

The covariance is computed as between Euler numbers $E_7$ and $E_6$, $E_7$ and $E_5$, $E_7$ and $E_4$, $E_6$ and $E_5$, $E_6$ and $E_4$, and $E_5$ and $E_4$. The covariance is associative. Thus, $\text{cov}(E_7, E_6)=\text{cov}(E_6, E_7)$, and so on.

Now that the variance and covariance are known for the features E7, E6, E5, and E4 of the image database 40, the variance-covariance matrix $M_{VC}$ may be computed according to one embodiment (block 208). For a database of images characterized using Euler vectors, $\xi_K$, the variance-covariance matrix $M_{VC}$ looks like:

$$M_{VC} = \begin{vmatrix} \delta_{E7}^2 & \text{cov}(E_6, E_7) & \text{cov}(E_5, E_7) & \text{cov}(E_4, E_7) \\ \text{cov}(E_7, E_6) & \delta_{E6}^2 & \text{cov}(E_5, E_6) & \text{cov}(E_4, E_6) \\ \text{cov}(E_7, E_5) & \text{cov}(E_6, E_5) & \delta_{E5}^2 & \text{cov}(E_4, E_5) \\ \text{cov}(E_7, E_4) & \text{cov}(E_6, E_4) & \text{cov}(E_5, E_4) & \delta_{E4}^2 \end{vmatrix}$$

Computation of the variance matrix, according to FIG. 7, is thus complete.

Once the variance-covariance matrix, $M_{VC}$, is known, the Mahalanobis distance may be measured between a query image $30q$ and one or more images 30 in the image database 40.

Figure 8:
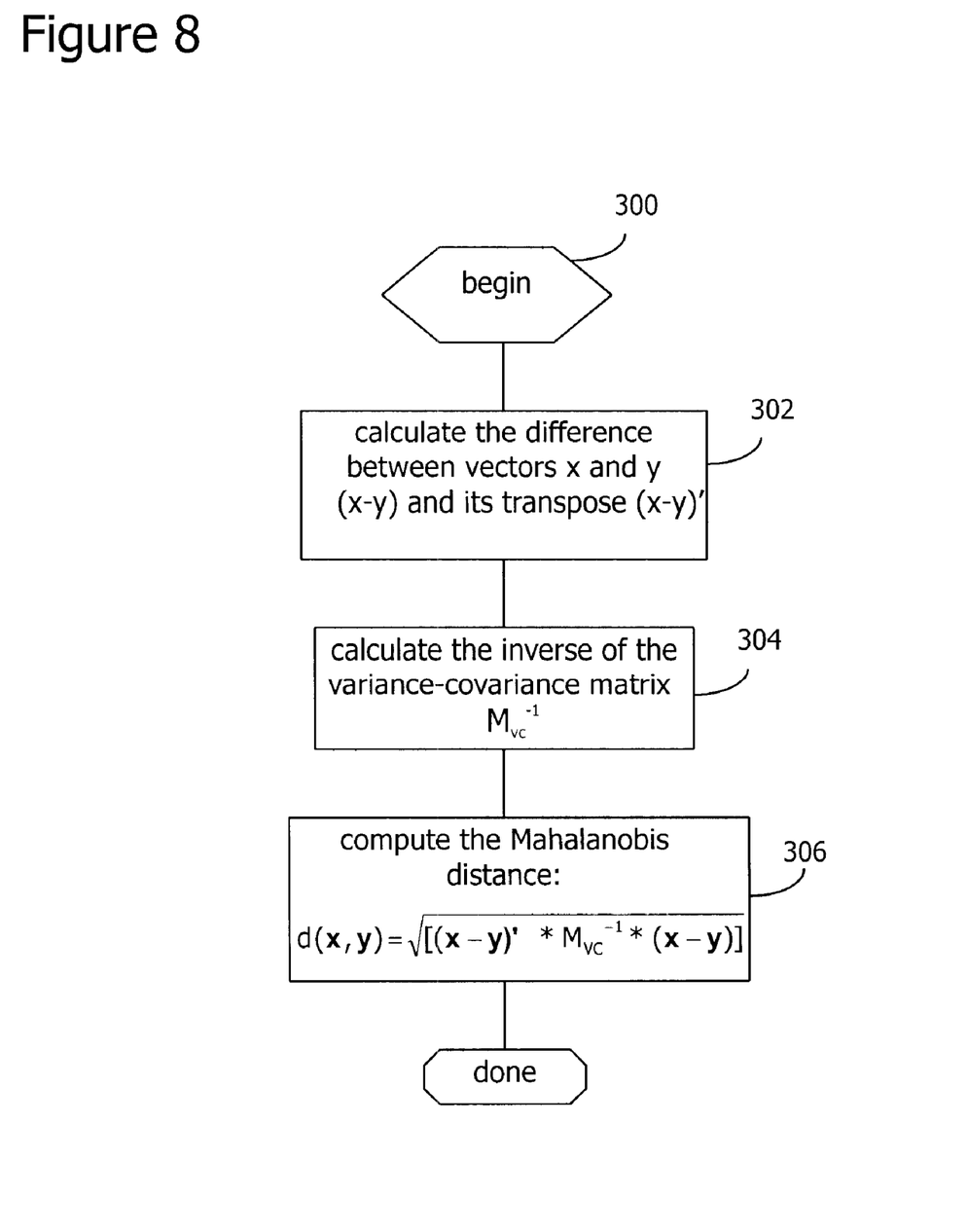
FIG. 8 is a flow diagram for calculating the Mahalanobis distance between a query image and plural images of the system of FIG. 6 according to one embodiment of the invention.

In one embodiment, the Mahalanobis distance is computed according to the flow diagram of FIG. 8 (block 302). First, a difference between two vectors is calculated. Each vector includes feature information for a given image 30. For example, where the Mahalanobis distance is sought between the query image $30q$ and the image $30a$ of the image database 40, the difference between the Euler vectors $\xi_q$ and $\xi_a$ is calculated. The difference between $\xi_q$ and $\xi_a$ is:

$$(\xi_q - \xi_a) = \begin{vmatrix} (E_{q7} - E_{a7}) \\ (E_{q6} - E_{a6}) \\ (E_{q5} - E_{a5}) \\ (E_{q4} - E_{a4}) \end{vmatrix}$$

Likewise, the transpose $(\xi_q-\xi_a)'$ is as follows:

$$(\xi_q-\xi_a)'=[(E_{q7}-E_{a7}), (E_{q6}-E_{a6}), (E_{q5}-E_{a5}), (E_{q4}-E_{a4})]$$

Additionally, to compute the Mahalanobis distance between image $30_q$ and any of the images 30 in the image database 40, the inverse of the variance-covariance matrix, $M_{VC}$, or $M_{VC}^{-1}$, is calculated (block 304). The inverse of the matrix $M_{VC}$ is calculated according to known principles.

From these operations, the Mahalanobis distance may be calculated (block 306). For example, using the query image 30q, the Mahalanobis distance may be calculated between the query image 30q and one or more of the images 30 in the image database 40, as follows:

$$d(\xi_q, \xi_a) = (\xi_q - \xi_a)' * M_{VC}^{-1} * (\xi_q - \xi_a)$$
$$d(\xi_q, \xi_b) = (\xi_q - \xi_b)' * M_{VC}^{-1} * (\xi_q - \xi_b)$$
$$d(\xi_q, \xi_c) = (\xi_q - \xi_c)' * M_{VC}^{-1} * (\xi_q - \xi_c)$$
$$\vdots$$
$$d(\xi_q, \xi_j) = (\xi_q - \xi_j)' * M_{VC}^{-1} * (\xi_q - \xi_j)$$

In one embodiment, the Mahalanobis distance measure 60 ranks the distance calculations in order from smallest to largest. Accordingly, the first entry into the result table 50 is the closest match for the query image 30q. In one embodiment, using the Euler vector as the representative image feature and the Mahalanobis distance as the closeness measure, the desired image is found to lie at minimum distance. Noisy and compressed versions of the query image 30q have next higher rank in the result table 50.

In some embodiments, the various features used to characterize the images 30 may not be equally important for retrieval. In such a case the elements of the variance-covariance matrix, $M_{VC}$, may be multiplied by a suitable weight factor according to the importance of the corresponding feature.

For very large databases, computing the distance from the query image 30q to all other images 30 in the database 40 may take substantial time. Thus, ranking and, in turn, retrieval, may be undesirably slow. To obviate the problem, multi-dimensional search techniques may be employed to retrieve a subset of images lying in the neighborhood of the query image 30q in the feature space. Ranking according to the proposed distance measure may then be performed on this subset only.

Range Trees

There are many techniques available for finding an item in a database. A sequential search of the database may occur, a hash table may be used and binary search techniques may be employed, as examples. A binary tree is a data structure used for storage, removal, and searching of items in a data set. With respect to the images 30 in the image database 40, it is desirable to find the image 30 that is similar to the query image 30q without searching all j of the images in the database 40.

In one embodiment, a multi-dimensional search tree is thus used for storing the images 30. The multi-dimensional search tree permits efficient retrieval of the images 30.

In one embodiment, images are stored in the binary tree at random. Sometimes, however, the data is not inserted into the binary tree in random order. The performance of a binary search, therefore, may be less than optimal. The binary tree may be "rebalanced" after each insertion or deletion of data. During rebalancing operations, the nodes of the binary tree are rearranged using rotations. Typically, these rotations minimize the height of the binary tree.

One type of binary tree is known as an AVL tree (named for its creators Adelson-Velskii and Landis). In this particular form of binary tree, rebalancing ensures that, for each node in the AVL tree, the difference in height between its subtrees, known as a balance factor, is not greater than 1.

In one embodiment, a four-dimensional range tree 62, as depicted in FIG. 6, is used as a data structure for storing the Euler vectors, $\xi_K$, associated with each image 30 in the database 40. The range tree 62 is four-dimensional because the Euler vector includes four features, Euler numbers $E_7$, $E_6$, $E_5$, and $E_4$. Using the Euler vector, $\xi_q$, for the query image 30q, the range tree 62 specifies a particular node. In one embodiment, the Mahalanobis distance measure 60 is performed between the query image 30q and only these images lying at the node, rather than on all images 30 of the range tree 62. The results may be ranked in descending order, such that the first distance value points to the matched image 30.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method comprising:

describing a plurality of images included in a database according to one or more features, wherein each feature is an Euler number;

receiving a query image;

computing a Mahalanobis distance between the query image and one of the plurality of images.

2. The method of claim 1, wherein computing a Mahalanobis distance between the query image and one of the plurality of images further comprises:

constructing a variance-covariance matrix using the one or more features of the plurality of images;

selecting a first image from the plurality of images, the first image comprising the one or more features; and computing the Mahalanobis distance between the first image and the query image using the variance-covariance matrix.

3. The method of claim 2, wherein constructing a variance-covariance matrix using the one or mere features of the plurality of images further comprises:

computing the mean of a feature of the plurality of images;

computing the variance of the feature of the plurality of images; and computing the covariance between a pair of features of the plurality of images.

4. The method of claim 3, further comprising:

constructing the variance-covariance matrix from the computed variances and covariances.

5. The method of claim 2, wherein computing the Mahalanobis distance between the first image and the query image using the variance-covariance matrix further comprises:

identifying a first vector for the first image, wherein the first vector numerically characterizes the one or more features of the first image;

identifying a query vector for the query image, wherein the query vector numerically characterizes the one or more features of the query image; and calculating the difference between the first vector and the query vector to produce a difference vector.

6. The method of claim 5, further comprising:

multiplying the difference vector by an inverse of the variance-covariance matrix to produce an intermediate result; and multiplying the intermediate result by an inverse of the difference vector.

7. The method of claim 6, further comprising:

storing the features of the plurality of images in a range tree.

8. A system comprising:

a processor;

an image database including plural images, each of the images described according to one or more features wherein each feature is an Euler number; and a machine-readable storage medium comprising a software program, that if executed by the processor, is effective to receive a query image, to compute a Mahalanobis distance between the query image and one of the plural images and to retrieve an image from the database.

9. The system of claim 8, wherein the software program, if executed by the processor, is effective to:

construct a variance-covariance matrix using one or more features of the plural images in the image database.

10. The system of claim 9, wherein the software program further computes the Mahalanobis distance by:

computing the mean of one or more features of the plural images;

computing the variance of one or more features of the plural images; and computes the covariance between pairs of features of the plural images.

11. The system of claim 10, wherein the software program further computes the Mahalanobis distance by:

identifying a first image of the image database, wherein the first image comprises a first vector which numerically characterizes the one or more features of the first image; and identifying a query vector for the query image, wherein the query vector numerically characterizes the one or more features of the query image.

12. The system of claim 11, wherein the software program further computes the Mahalanobis distance by:

calculating a difference between the first vector and the query vector to produce a difference vector; and calculating an inverse of the difference vector.

13. The system of claim 12, wherein the software program further computes the Mahalanobis distance by:

multiplying the difference vector and an inverse of the variance-covariance matrix to produce an intermediate result; and multiplying the intermediate result by an inverse of the difference vector.

14. An article comprising a machine-readable medium storing instructions to enable a processor-based system to:

describe a plurality of images included in a database according to one or more respective features, wherein each feature is an Euler number;

receive a query image;

compute a Mahalanobis distance between the query image and one of the plurality of images and retrieve an image from the database.

15. The article of claim 14, further storing instructions to enable a processor-based system to:

construct a variance-covariance matrix using the one or more features of the plurality of images;

select a first image from the plurality of images, the first image comprising the one or more features; and compute the Mahalanobis distance between the first image and the query image using the variance-covariance matrix.

16. The article of claim 15, further storing instructions to enable a processor-based system to:

compute the mean of a feature of the plurality of images;

compute the variance of the feature of the plurality of images; and compute the covariance between a pair of features of the plurality of images.

17. The article of claim 16, further storing instructions to enable a processor-based system to:

construct the variance-covariance matrix from the computed variance and covariance.

18. The article of claim 17, further storing instructions to enable a processor-based system to:

identify a first vector for the first image, wherein the first vector numerically characterizes the one or more features of the first image;

identify a query vector for the query image, wherein the query vector numerically characterizes the one or more features of the query image; and calculate the difference between the first vector and the query vector to produce a difference vector.

19. The article of claim 18, further storing instructions to enable a processor-based system to:

multiply the difference vector by an inverse of the variance-covariance matrix to produce an intermediate result; and multiply the intermediate result by an inverse of the difference vector.

20. The article of claim 19, further storing instructions to enable a processor-based system to:

store the features of the plurality of images in a range tree.

* * * * *